(12) United States Patent
Diego

(10) Patent No.: US 6,698,580 B2
(45) Date of Patent: Mar. 2, 2004

(54) ADJUSTABLE ROLLER CONVEYOR MODULE

(75) Inventor: Glenn T. Diego, Newark Valley, NY (US)

(73) Assignee: Lockheed Martin Corporation, Bethesda, MD (US)

(*) Notice: Subject to any disclaimer, the term of this patent is extended or adjusted under 35 U.S.C. 154(b) by 89 days.

(21) Appl. No.: 10/173,474

(22) Filed: Jun. 17, 2002

(65) Prior Publication Data

US 2003/0230467 A1 Dec. 18, 2003

(51) Int. Cl.7 .................... B65G 15/26; B65G 13/00
(52) U.S. Cl. ............. 198/588; 193/35 TE; 198/812; 198/594
(58) Field of Search ................ 198/588, 594, 198/583, 782, 860.2, 861.1, 812; 193/35 TE

(56) References Cited

U.S. PATENT DOCUMENTS

| | | | | |
|---|---|---|---|---|
| 2,438,527 A | * | 3/1948 | Werner | 193/35 R |
| 2,613,788 A | * | 10/1952 | McLaughlin | 193/35 TE |
| 3,308,874 A | | 3/1967 | Anderson | |
| 4,172,677 A | * | 10/1979 | Gunti | 403/189 |
| 4,232,774 A | * | 11/1980 | Gunti | 193/35 J |
| 4,266,650 A | * | 5/1981 | Patel et al. | 193/35 TE |
| 4,640,404 A | * | 2/1987 | Bigott | 193/35 TE |
| 5,096,045 A | * | 3/1992 | Feldl | 198/583 |
| 5,147,025 A | | 9/1992 | Flippo | |
| 5,224,584 A | | 7/1993 | Best et al. | |
| 5,407,054 A | | 4/1995 | Matsuda et al. | |
| 5,609,238 A | * | 3/1997 | Christensen | 198/583 |
| 5,762,178 A | * | 6/1998 | Tarlton | 198/860.2 |
| 5,964,338 A | | 10/1999 | Schroader | |
| 6,484,862 B1 | * | 11/2002 | Gilmore et al. | 193/35 TE |
| 6,510,935 B1 | * | 1/2003 | McIlvaine | 193/35 R |

* cited by examiner

Primary Examiner—Richard Ridley
(74) Attorney, Agent, or Firm—Louis J. Franco; Leland D. Schultz; Patrick M. Hogan

(57) ABSTRACT

An adjustable roller conveyor module includes a first support structure comprising first and second laterally spaced, longitudinally extending frame members. A first roller set supported by the first support structure includes rollers rotatable about lateral axes equi-spaced in accordance with a predetermined roller-axis spacing. A second support structure is carried between the first and second frame members of the first support structure for longitudinal reciprocation between fully retracted and extended positions. The second support structure supports a second roller set including rollers rotatable about lateral axes coplanar with the axes of the first roller set and equi-spaced in accordance with the predetermined roller-axis spacing. Selected rollers of the first roller set are removable to accommodate retraction of the second support structure. A set of extension apparatus is extendable beyond each end of the conveyor module and reciprocable between fully retracted and extended positions separated by a distance corresponding to at least one half of the roller-axis spacing.

12 Claims, 6 Drawing Sheets

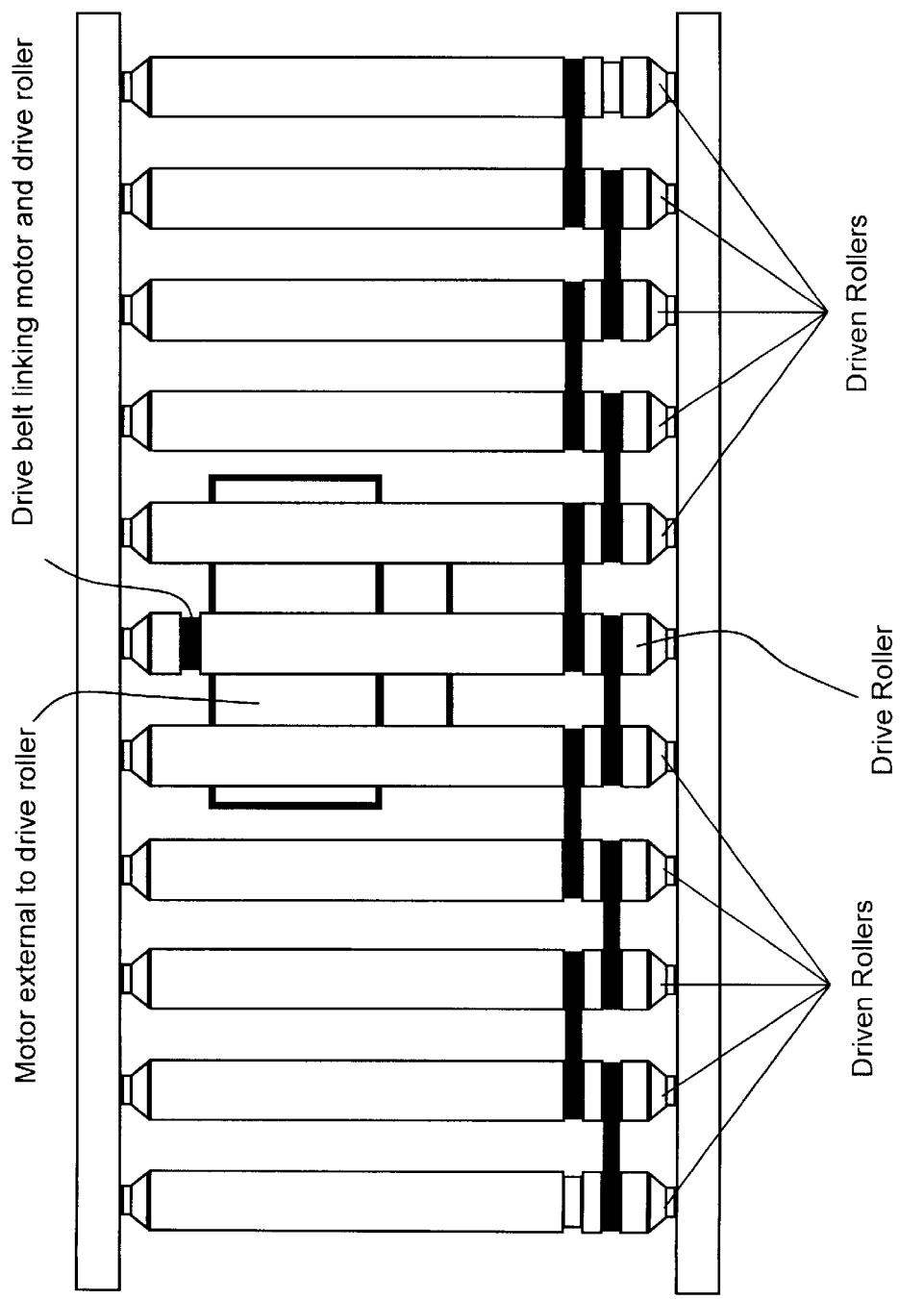
FIG. A (Background)

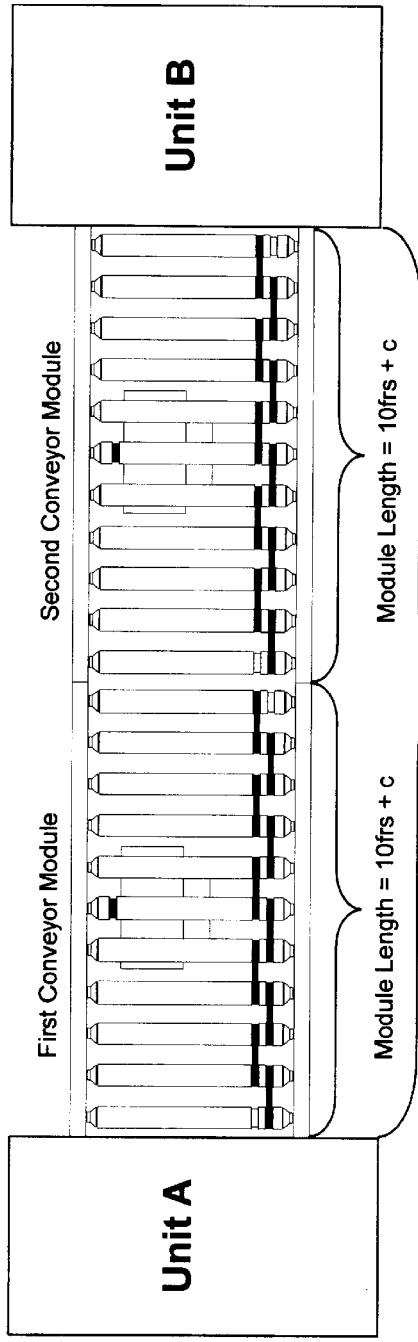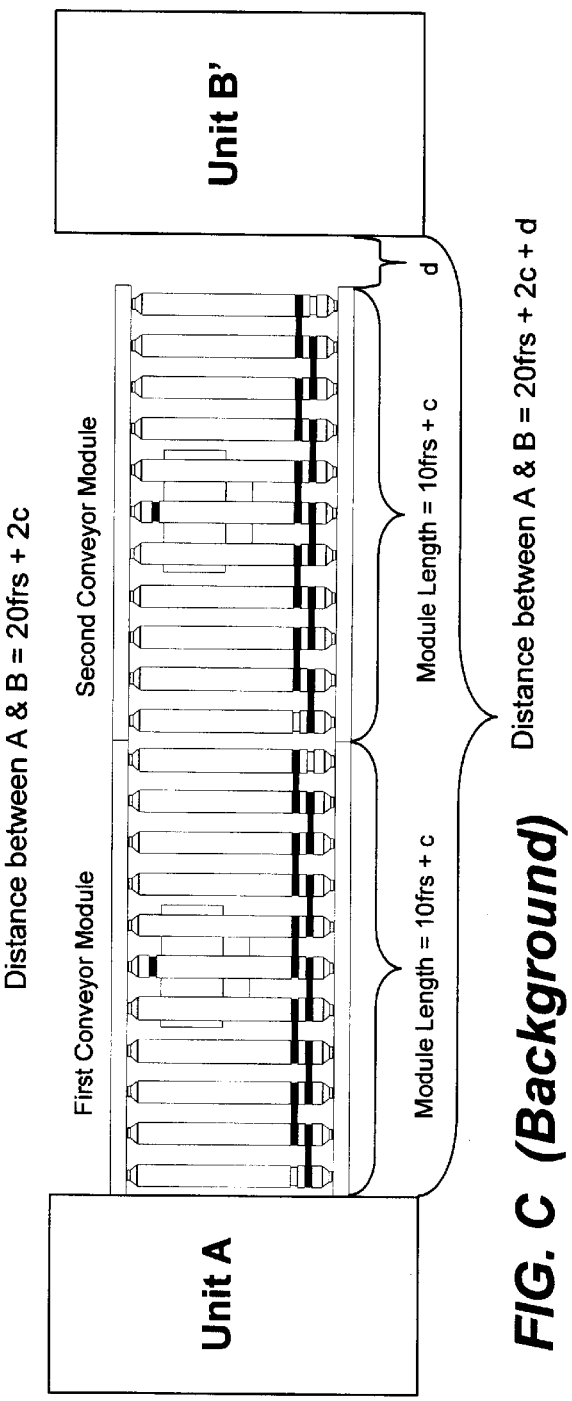

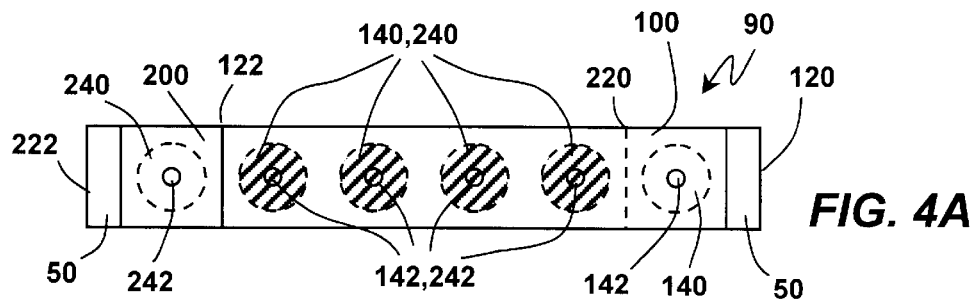
*FIG. 4A*
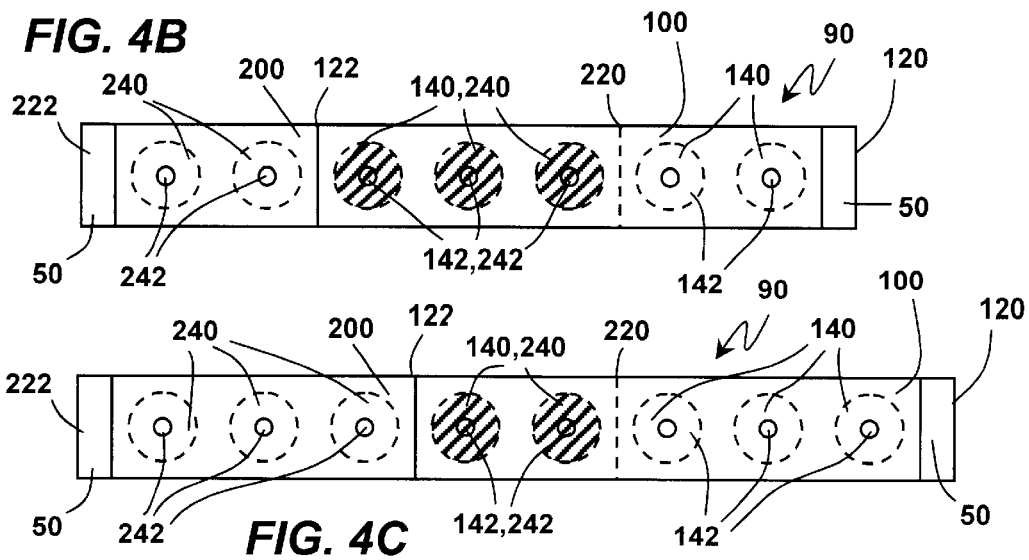
*FIG. 4B*
*FIG. 4C*
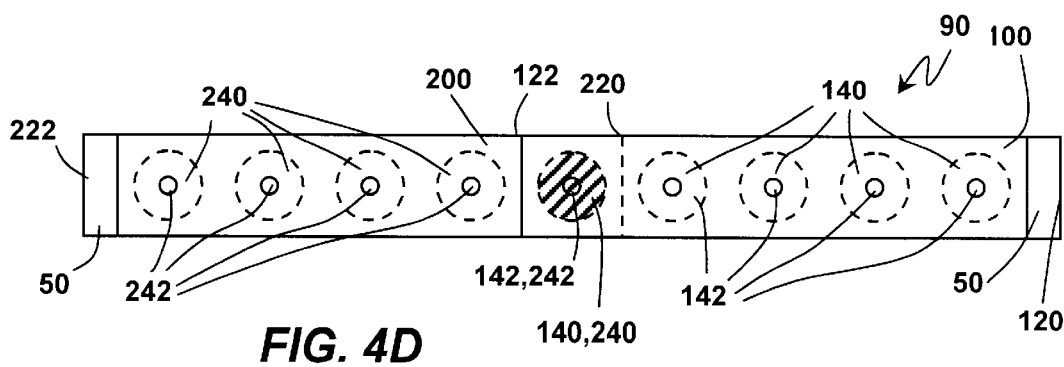
*FIG. 4D*
 — Predetermined Roller Axis Spacing RS

ADJUSTABLE ROLLER CONVEYOR MODULE

BACKGROUND

1. Field

Although not so limited in its utility or scope, implementations of the present invention are particularly well suited for incorporation in intra-facility transport systems such as those used in moving mail pieces through various stages of processing in a mail processing facility, for example.

2. Brief Description of an Illustrative Environment and Related Art

Large-scale material handling operations frequently involve the use of intra-facility transport systems such as conveyor belts and power roller conveyors. A module of a typical power roller conveyor includes a support structure defined by first and second laterally spaced, elongated frame members arranged in parallel and extending along a central longitudinal axis. Extending between, and supported by, the parallel frame members is a plurality of rollers, each of which rollers rotates about an axis perpendicular to the central longitudinal axis and parallel to the axes of other rollers among the plurality. The axes of the rollers are typically spaced apart in accordance with recognized industry-standard specifications. For instance, the roller spacing (i.e., distance between the roller axes) of a typical power roller conveyor in a mail-processing facility is 3 inches. Regardless of the roller spacing peculiar to a particular industry or application, the roller spacing in any particular power roller conveyor is typically fixed.

A typical module of a power roller conveyor includes at least one drive roller and a plurality of "driven" rollers. In some instances, the drive roller is mechanically linked to a motor through, for example, a belt, chain or drive shaft so that the motor can selectively rotate the drive roller. In other, typically more modern, configurations, the drive roller typically contains the motor internally. Driven rollers are mechanically linked to the drive roller, either directly or through intervening driven rollers, by belts or "o-rings," for example. FIG. A illustrates a typical arrangement of driven rollers in relation to a single drive roller from which the driven rollers draw power. It is common for the drive roller to be among the central rollers along a power roller conveyor module because such an arrangement centers the torque transmission to the driven rollers.

Power roller conveyors are used to transport objects (e.g., mail piece trays) from one location to another within a mail-processing facility, for example. Frequently, an overall conveyor system comprises numerous roller conveyor modules linked in series. A single roller conveyor module can be used to join one roller conveyor segment to another roller conveyor segment, a roller conveyor segment to a piece of processing equipment or one piece of processing equipment to a second piece of processing equipment, for example. Typically, roller conveyor modules are fabricated in fixed lengths correlating to some whole-number multiple of the fixed roller spacing plus some constant. Difficulties arise, for example, as equipment is replaced and the spacing between a replacement piece of equipment and another fixed point within the facility is not equal to the distance between the replaced piece of equipment and the fixed point or, worse, does not correspond to a whole-number multiple of the fixed roller spacing plus the original constant. Consider the schematic illustration of such a scenario in conjunction with FIGS. B and C. In the original arrangement of FIG. B, first and second conveyor modules are arranged in series between units A and B. Each conveyor module is ten times the fixed roller spacing (frs) plus a constant "c" in length and the distance between units A and B is 20 frs+2 c. In FIG. C, unit B' has replaced unit B and is set in place a distance equal to 20 frs+2 c+d from unit A, thereby leaving a gap of length d between the second conveyor module and unit B'.

Situations such as the one illustrated in FIGS. B and C result in dilemmas presenting choices such as adjusting the position of the replacement equipment and changing the roller spacing between two or more rollers near one or both ends of the roller conveyor module. Moving the piece of equipment is often not practical for any of various reasons. A single piece of mail-processing equipment, for example, can measure well in excess of one hundred feet long and weigh several tons. Moreover, these machines are frequently situated between two sets of conveyor apparatus, rendering movement away from one set of conveyor apparatus toward the other impossible. Adjusting the roller spacing near the end of a roller conveyor module presents difficulties of its own. For instance, the frame members may require cutting to shorten them or the addition of custom-cut lengths to lengthen them, new holes need to be bored in the frame members and the rollers mounted in the new holes. An obstacle other than the actual customization of the conveyor module is that changes in the spacing between rollers require drive belts or o-rings of different, and often, non-standard sizes thereby creating a need for customized o-rings.

Accordingly, there exists a need for a roller conveyor module that is adjustable in length and that is adapted for the selective addition and removal of rollers as indicated by a particular situation.

SUMMARY

In various embodiments, an adjustable roller conveyor module includes a roller support structure having first and second ends and first and second laterally spaced, elongated frame members arranged in parallel and extending between the first and second ends along a central longitudinal axis. Extending between, and supported by, the parallel frame members is a plurality of rollers, each of which rollers rotates about an axis perpendicular to the central longitudinal axis and parallel to the axes of other rollers among the plurality. The roller axes of the rollers supported by the support structure lie along a roller plane and, in a typical version, are spaced equally in accordance with a predetermined roller-axis spacing. At least one of the first and second ends of the support structure includes a set of extension apparatus adapted for selective extension to, and retention in, various positions in which the extension apparatus extends beyond the end of the support structure, thereby rendering the overall length of the support structure adjustable. The extension apparatus is adapted for selective coupling to, for example, a unit of equipment (e.g., another conveyor module) adjacent the conveyor module from which it depends. In a typical embodiment, each set of extension apparatus is infinitely positionable, and selectively retainable, between a fully retracted and a fully extended position. That is, the extension apparatus can be selectively retained in any position of an infinite number of positions along a continuum between the fully retracted and extended positions.

In another embodiment, an adjustable roller conveyor module includes first and second support structures. Each of the first and second support structures has first and second laterally spaced, elongated frame members arranged in parallel and extending along a central longitudinal axis. Extending between, and supported by, the parallel frame members is a plurality of rollers, each of which rollers rotates about an axis which, in a typical embodiment, is perpendicular to the central longitudinal axis and parallel to the axes of other rollers among the plurality. A typical embodiment is further characterized in that the roller axes of the rollers supported by each support structure lie along a roller plane and are spaced equally in accordance with a predetermined roller-axis spacing.

In various embodiments, the roller axes of the rollers supported by the first support structure are coplanar with the roller axes of the rollers supported by the second support structure. Accordingly, in a typical embodiment, one of the first and second support structures is reciprocably received between the elongated frame members of the other of the first and second support structures such that one support structure is regarded as an outer support structure and the other support structure is regarded as an inner support structure. Moreover, to accommodate the linear retraction of the inner support structure into (e.g., between the first and second frame members of) the outer support structure, each roller of a selected set of rollers of the outer support structure is selectively removable. With the removal of each successive roller in the outer support structure, the inner support structure is permitted to linearly retract into the outer support structure by a distant corresponding to the fixed spacing between the rollers of the outer support structure. Conversely, as the inner support structure is extended, rollers may be added to the outer support structure to eliminate "gaps" in roller-spacing continuity.

In some versions, the elongated frame members of the outer and inner support structures include roller-mounting apertures, each of which apertures is adapted for receiving an end a roller axle. The roller-mounting apertures are equally spaced in accordance with a predetermined roller-axis spacing. The roller-mounting apertures are furthermore situated so that the elongated frame members of the inner support structure are slidable into incremental positions in which roller-mounting apertures of the inner support structure are aligned with roller-mounting apertures of the outer support structure in an overlapping relationship. In a typical version, the axles of rollers mounted in overlapping apertures extend through the opposed roller-mounting apertures of the inner support structure and at least partially into the opposed roller-mounting apertures of the outer support structure. Rollers mounted within the roller-mounting apertures of both the inner and outer support structures are regarded as members of a more broadly definable set of rollers referred to as "shared" rollers. It will be appreciated that the number of shared rollers depends in various implementations on the degree of extension of the inner support structure with respect to the outer support structure.

In various aspects, the outer support structure includes extension apparatus capable of extending beyond the "free end" of the outer support structure opposite the end beyond which the inner support structure extends for adjusting the overall length of the conveyor module. Various versions further include extension apparatus for similarly extending beyond the free end of the inner support structure. The capacity for the extension apparatus in any particular version to extend "beyond the 'free end'" of the support structure in no way implies that, in such a version, the extension apparatus must be retractable into a position in which it does not extend beyond the free end to some degree. For instance, in a version illustrative of the preceding point, the "most retracted" position of the extension apparatus is one in which the extension apparatus still protrudes beyond the free end; however, even in this version, the extension apparatus is capable of "extending beyond the free end" of the support structure, albeit to some greater degree than when it is in its most retracted position. The same non-limiting interpretation applies equally to single-support-structure conveyor modules that include extension apparatus.

When extension members adjacent each end of the overall conveyor module are each in a first retracted position and, for example, the outer and inner support structures are aligned for the inclusion of one or more shared rollers, the overall length of the module is equal to a whole-number multiple of the predetermined roller spacing plus some first constant. In various versions, each extension member is extendable beyond the free end of the support structure from which it depends by a distance equal to at least one-half the predetermined roller-axis spacing so that the overall length of the conveyor module can be extended, without translating the inner support structure with respect to the outer support structure, by a length at least as long as the predetermined roller-axis spacing. It will be appreciated that a conveyor module has some maximally retracted length in which some maximum number of rollers is shared and the extension members are fully retracted and some maximally extended length in which some minimum number of rollers is shared and the extension members are maximally extended. It will furthermore be appreciated that when each extension member is adapted for selective retention in any position between its first retracted position and a second extended position corresponding to an overall increase in the length of the support structure of at least one-half of the predetermined roller-axis spacing beyond the minimum assumable length of the support structure from which in depends, the conveyor module can be adjusted to assume any overall length between its maximally retracted and maximally extended lengths.

BRIEF DESCRIPTION OF THE DRAWINGS

FIG. A depicts an illustrative fixed-length power roller conveyor module;

FIGS. B and C illustrative one particular difficulty encountered with fixed-length conveyor modules;

FIGS. 4A through 4D schematically illustrate various degrees of extension, and the corresponding number of shared rollers in each of four positions, of the inner support structure with respect to the outer support structure of an illustrative dual-support-structure conveyor module.

DETAILED DESCRIPTION

The following description of various embodiments of a roller conveyor module is illustrative in nature and is therefore not intended to limit the scope of the invention or its application of uses.

Figure 1:
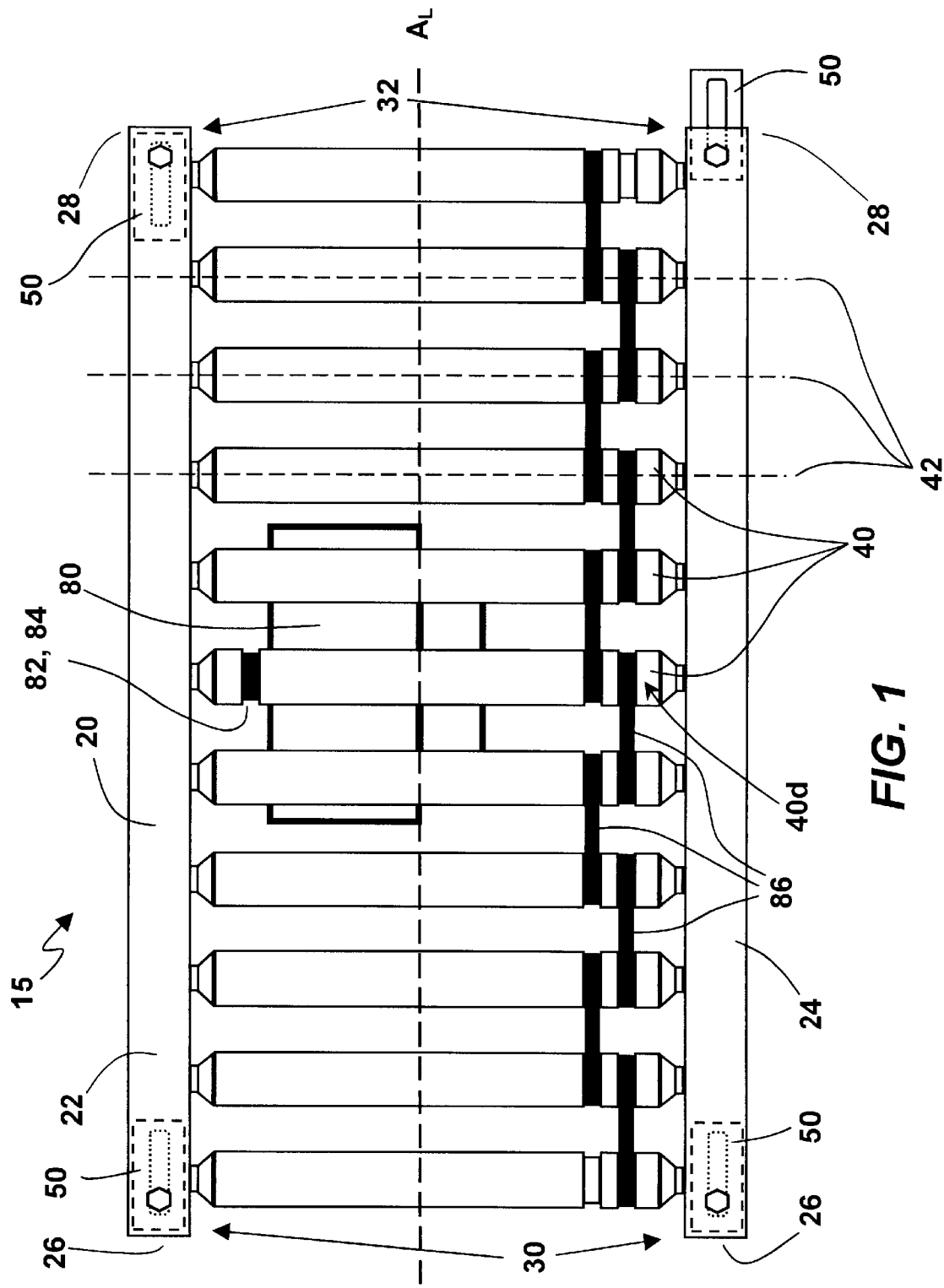
FIG. 1 depicts an illustrative adjustable-length roller conveyor module.

Referring to FIG. 1, an adjustable roller conveyor module 15 includes a roller support structure 20. The roller support structure 20 includes first and second laterally spaced, elongated frame members 22 and 24 arranged in parallel and extending along a longitudinal axis $A_L$. Each of the first and second frame members 22 and 24 has a first end 26 and a second end 28 coinciding with, respectively, first and second ends 30 and 32 of the roller support structure 20. Extending between, and supported by, the parallel frame members 22 and 24 is a plurality of rollers 40. In a typical embodiment, each roller 40 rotates about a roller axis 42 that extends perpendicularly to the central longitudinal axis and parallel to the axes 42 of other rollers among the plurality. Furthermore, in a typical version, the axes 42 of the rollers 40 supported by the support structure 20 lie along a roller plane and are spaced equally in accordance with a predetermined roller-axis spacing constant.

Figure 2:
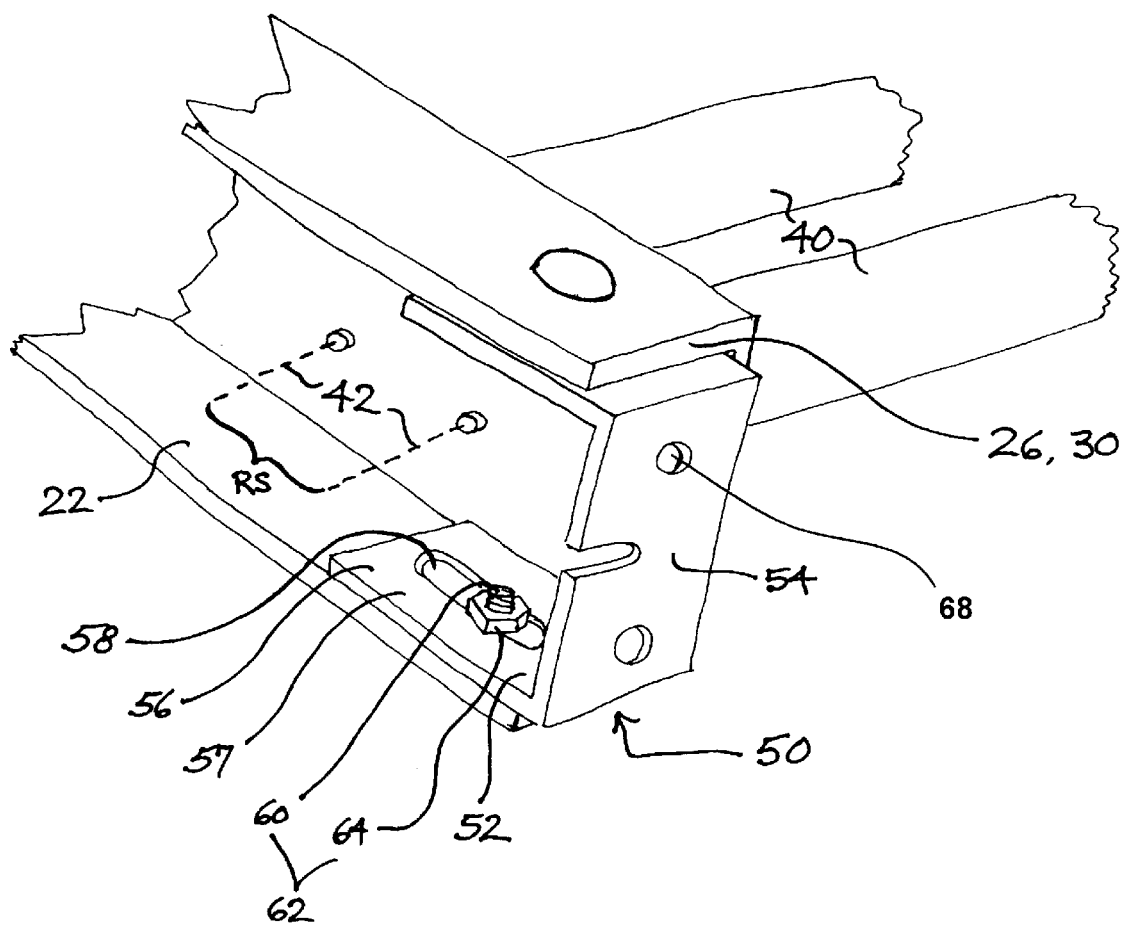
FIG. 2 is an enlarged view of an extension apparatus on the conveyor module of FIG. 1.

The roller support structure 20 further includes extension apparatus 50 adapted for extending the overall length of the conveyor module 15. The illustrative version of FIG. 1 includes extension apparatus 50 reciprocably depending from the support structure 20 and adapted for selective positioning beyond each of the first and second ends 30 and 32 of the roller support structure 20. In FIG. 1, extension apparatus 50 adjacent the first ends 26 of the first and second frame members 22 and 24 and adjacent the second end 28 of the first frame member 22 are in retracted positions. The extension apparatus 50 at the second end 28 of the second frame member 24 is in an extended position. Referring to the illustrative extension apparatus 50 in the enlarged view of FIG. 2, a coupling element 52 reciprocably depends from, and is adapted for extension beyond the first end 26 of, the first elongated frame member 22. The coupling element 52 includes a coupling plate 54 oriented along a plane that extends perpendicularly to the roller-axis plane $P_{RA}$ and the longitudinal axis $A_L$ of the roller support structure 20. The coupling plate 54 rigidly depends from an adjustment member 56. In the particular illustrative embodiment of FIG. 2, the adjustment member 56 comprises a plate 57 having a dimension that extends in a direction parallel to the longitudinal axis $A_L$ of the support structure 20. The adjustment member 56 includes an elongated slot 58 through which the male member 60 of a male-female fastener pair 62 (e.g., a bolt and nut) extends for coupling with the female member 64 of the fastener pair 62. The elongated slot 58 is oriented such that, when the fastener pair 62 is loosened, the coupling element 52 can be longitudinally reciprocated between a fully retracted position and positions in which the overall length of the support structure 20 is extended. For the embodiment of FIG. 2, the latter positions correspond to positions in which the coupling plate 54 extends beyond the first end 26 of the first elongated frame member 22. Once the desired position for the extension member 56 is achieved, the adjustment member 56 is fixed in position with respect to the support structure 20 by tightening the fastener pair 62 until another position is desired.

The coupling plate 54 is adapted for coupling to a unit of equipment adjacent the conveyor module 15 from which the coupling plate 54 depends. Referring still to the illustrative version of FIG. 2, the coupling plate 54 includes at least one aperture 68 adapted for receipt of a coupling fastener (e.g., a bolt, not shown) depending from an adjacent unit of equipment to which the conveyor module 15 is to be selectively coupled. Although numerous alternative configurations for extension apparatus 50 and coupling elements 52 within the scope and contemplation of the invention will readily occur to those of ordinary skill in the art and, furthermore, while the particular configuration of the coupling element 52 is secondary to functionality (i.e., the capacity to be extended and coupled to an adjacent object), a few illustrative alternative suggestions are described. The following alternatives represent a limited set of alternative configurations intended to suggest alternative apparatus for embodying and practicing the invention. Accordingly, the following alternative configurations are illustrative only and in no way intended as a limitation on the scope of the invention as expressed in the claims.

In one alternative version, an elongated slot is included in the elongated frame member rather than, or in addition to, the adjustment member 56. In other versions, a threaded male fastener member 60 fixedly depends from one of the adjustment member 56 and the support structure 20 and the other of the adjustment member 56 and support structure 20 includes a slot 58 for receiving the male fastener member 60. In another version, one of the support structure 20 and the adjustment member 56 includes a threaded bore constituting a female fastener member 64 adapted for receiving a male fastener member 60 that passes through a bore in, or otherwise depends from, the other of the support structure 20 and adjustment member 56. In still another version, a ratchet system (not shown) is employed for alternative incremental extension and retraction of the coupling element 52 with respect to the support structure 20. In a version including a ratchet system, one of the support structure 20 and the adjustment member 56 includes a toothed or notched surface including troughs selectively and interdentably engageable by a pawl pivotably or slidably depending from the other of the support structure 20 and adjustment member 56.

The illustrative roller conveyor module 15 of FIG. 1 is a power roller conveyor module and includes a drive motor 80 mechanically linked to a drive roller 40d by, in this case, a flexible mechanical linkage 82 comprising a main drive belt 84. The rollers 40 other than drive roller 40d are driven rollers mechanically linked to the drive roller 40d either directly (i.e., in the case of the two rollers 40 adjacent the drive roller 40d) or indirectly through secondary drive belts 86. It will be appreciated, however, that the invention is not limited in implementation or applicability to power roller conveyors 15. Furthermore, when the roller conveyor 15 to which an embodiment of the invention is applied is a power roller conveyor 15, various versions include alternative drive mechanisms. For instance, as previously stated, modern power roller conveyors include drive motors rollers contained inside the drive rollers. In other embodiments having external drive motors, various mechanical linkages are employed to connect the motor to the drive roller, and adjacent rollers to one another, including drive chains and shafts by way of non-limiting example. Finally, the various illustrative versions of extension apparatus 50 and drive mechanisms described with respect to single-support structure conveyor modules 15 are also adaptable for use in association with multi-support-structure conveyor modules such as the illustrative dual-support-structure conveyor modules 90 discussed below.

Figure 3:
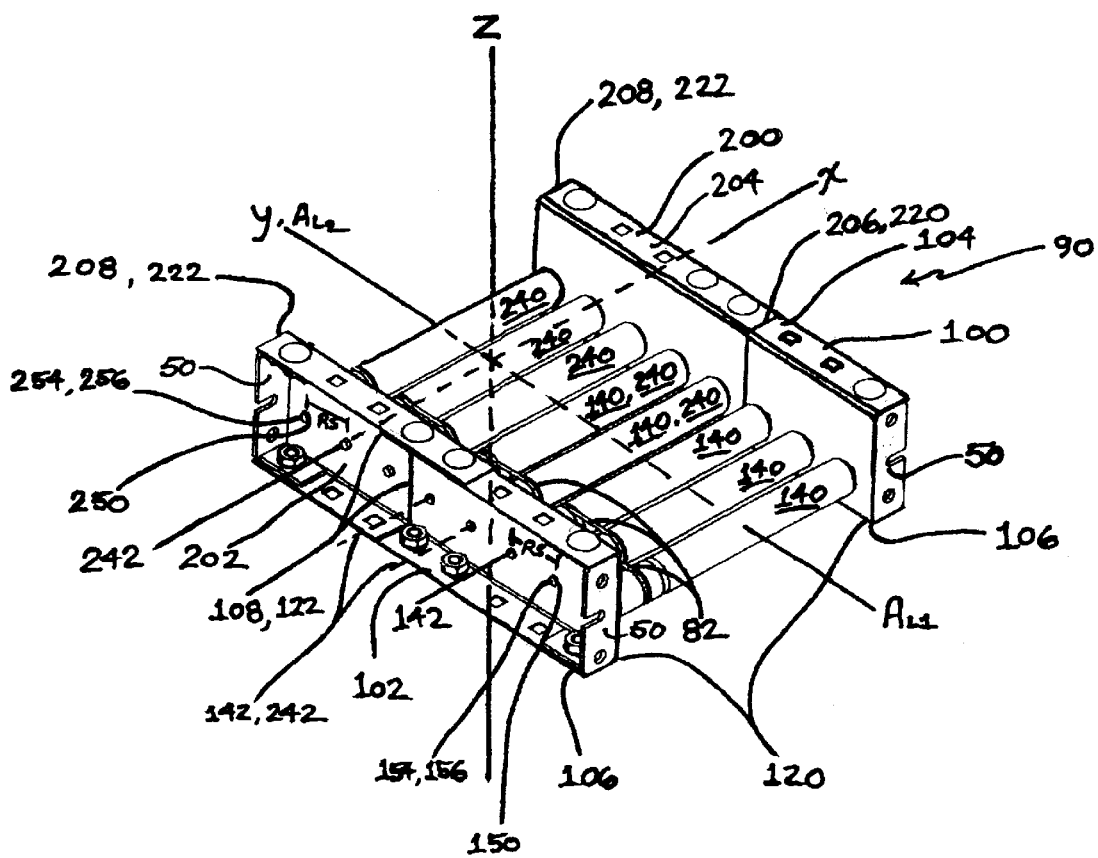
FIG. 3 depicts as illustrative dual-support-structure roller conveyor module.

Referring to FIG. 3, an illustrative alternative roller conveyor module 90 includes a first roller-support structure 100 and a second roller-support structure 200. The first support structure 100 includes first and second laterally spaced, elongated frame members 102 and 104 arranged in parallel and extending along a longitudinal axis $A_{L1}$. Each of the frame members 102 and 104 has a first end 106 and a second end 108 coinciding with, respectively, a first end 120 and a second end 122 of the first support structure 100. A first plurality of rollers 140 extends between, and is supported by, the parallel frame members 102 and 104. Each of the rollers 140 rotates about a roller axis 142 that extends perpendicularly to the central longitudinal axis $A_{L1}$, and parallel to the axes 142 of other rollers 140 among the first plurality of rollers 140. Moreover, the roller axes 142 are spaced apart equally in accordance with a predetermined roller-axis spacing RS.

The second support structure 200 includes first and second laterally spaced, elongated frame members 202 and 204 arranged in parallel and extending along a central longitudinal axis $A_{L2}$. Each of the frame members 202 and 204 has a first end 206 and a second end 208 coinciding with, respectively, a first end 220 and a second end 222 of the second support structure 200. A second plurality of rollers 240 extends between, and is supported by, the parallel frame members 202 and 204. Each of the rollers 240 rotates about a roller axis 242 that extends perpendicularly to the central longitudinal axis $A_{L2}$ and parallel to the axes 242 of other rollers 240 among the second plurality. In addition, the roller axes 242 of the second plurality of rollers 240 are spaced apart in accordance with the same predetermined roller-axis spacing RS as the roller axes 142 of the first plurality of rollers 140.

An embodiment, such as the embodiment of FIG. 3, is furthermore typified in that the roller axes 142 of the rollers 140 lie along a first roller plane and the roller axes 242 of the rollers 240 lie along a second roller plane. Furthermore, in a typical embodiment, the roller axes 142 of the rollers 140 are coplanar with the roller axes 242 of the rollers 240. For instance, the roller axes 142 and 242 in FIG. 3 lie in the x-y plane as defined by the Cartesian coordinate system superimposed over the roller conveyor module 90. Accordingly, the second roller support structure 200 is reciprocably received between the elongated frame members 102 and 104 of the first roller support structure 100 such that the first roller support structure 100 is regarded as an outer support structure and the second roller support structure 200 is regarded as an inner support structure. Moreover, to accommodate the linear retraction of the inner support structure 200 into the outer support structure 100, each roller 140 of a selected set of rollers 140 of the outer support structure 100 is selectively removable. With the removal of each successive roller 140 in the outer support structure 100, the inner support structure 200 is permitted to linearly retract into the outer support structure 100 typically by an amount corresponding to the fixed spacing between the rollers 140 of the outer support structure 240. Conversely, as the inner support structure 200 is extended, rollers 140 may be added to the outer support structure 100 to eliminate gaps in roller-spacing continuity.

It will be appreciated that among various embodiments, rollers 140 and 240 may be variously mounted within their respective support structures 100 and 200. For instance, rollers are alternatively retained in existing roller conveyors by (i) axles including opposed, outwardly-biased (e.g., spring-loaded) ends that linearly reciprocate along the roller axis and are normally biased into engagement with roller-mounting apertures in the roller-support structure and (ii) axles having opposed threaded ends that extend through roller-mounting apertures and in which each end threadably receives an internally threaded fastening member such as nut, for example.

Referring to the version of FIG. 3, the elongated frame members 102 and 104 of the outer support structure 100 include roller-mounting apertures 150, each of which apertures 150 is adapted for receiving and supportably engaging the end 156 of a roller axle 154. Correspondingly, the elongated frame members 202 and 204 of the inner support structure 200 include roller-mounting apertures 250, each of which apertures 250 is adapted for receiving and supportably engaging the end 256 of a roller axle 254. The roller-mounting apertures 150 and 250 are equally spaced in accordance with the predetermined roller-axis spacing RS. The roller-mounting apertures 150 and 250 are furthermore situated so that the elongated frame members 202 and 204 of the inner support structure 200 are slidable into incremental positions in which roller-mounting apertures 250 of the inner support structure 200 are aligned with roller-mounting apertures 150 of the outer support structure 100. Rollers 140, 240 mounted in aligned apertures 150 and 250 extend through the opposed roller-mounting apertures 250 of the inner support structure 200 and are supportably engaged by the opposed roller-mounting apertures 150 of the outer support structure 100. A roller 140, 240 supported between the elongated frame members 102 and 104 and 202 and 204 of both the outer and inner support structures 100 and 200 is referred to as a "shared" roller 140, 240, regardless of whether it is actually supported by both the outer and inner support structure 100 and 200. For instance, certain versions are envisioned in which the rollers 240 of the inner support structure are not readily removable in the ordinary course of usage and, furthermore, do not have axles 254 sufficiently long to engage the apertures 150 of the outer support structure 100 even when aligned with such apertures 150. Nevertheless, such a roller 240 is regarded as shared when it occupies a position between the first pair of frame members 102 and 104 and the second pair of frame members 202 and 204 and, for example, when the apertures 250 by which it is supportably engaged are aligned with a pair of opposed apertures 150 adapted for retaining a roller 140 when the inner support structure 200 is sufficiently extended. The shared rollers 140, 240 are more generally identifiable as those rollers 140, 240 whose axes 142, 242 are longitudinally situated between the second end 122 of the first support structure 100 and the first end 220 of the second support structure 200. For illustrative purposes, the reference numbers 140, 240 refer to the shared rollers in the drawings since the shared rollers 140, 240 can be conceptualized in terms of "belonging" to each of the outer and inner support structures 100 and 200.

It will be appreciated that the number of shared rollers 140, 240 depends in any particular embodiment on the degree of extension of the inner support structure 200 with respect to the outer support structure 100. Consider the illustrative side-view schematic representations of FIGS. 4A through 4D in which all rollers 140, 240 and 140, 240 are separated in accordance with predetermined roller-axis spacing RS. The outer and inner support structures 100 and 200 each have the capacity to retain five total rollers 140, 240 and/or 140, 240. In the first case shown in FIG. 4A, the inner support structure 200 is retracted into the outer support structure 100 to an extent in which the inner support structure 200 is retaining a single unshared roller 240, the outer support structure 100 is retaining a single unshared roller 140 and there are four shared rollers 140, 240 situated between the second end 122 of the outer support structure 100 and the first end 220 of the inner support structure 200. In the second instance depicted in FIG. 4B, the inner support structure 200 has been extended by a displacement having a magnitude equal to 1×(predetermined roller-axis spacing RS). In this instance, the inner support structure 200 supports two unshared rollers 240, the outer support structure 100 supports two unshared rollers 140 and there are three shared rollers 140, 240 supported between the second end 122 of the outer support structure 100 and the first end 220 of the inner support structure 200. In FIGS. 4C and 4D, the inner support structure 200 has been incrementally extended with respect to the outer support structure 100 by 2×SR and 3×SR, respectively, from the position depicted in FIG. 4A. In the case of FIG. 4D, there is only a single shared roller 140, 240 and the inner support structure 200 and outer support structure 100 support, respectively, four unshared rollers 240 and four unshared rollers 140. In each instance illustrated in FIGS. 4A through 4D, the inner support structure 200 is selectively retained in a position in which the distance between the roller axis 142, 242 of the shared roller 140, 240 nearest the first end 220 of the inner support structure 200 and the roller axis 142 of the unshared roller 140 of the first set of rollers 140 nearest the second end 122 of the outer support structure 100 corresponds to the predetermined roller-axis spacing RS so that roller spacing continuity is maintained along the conveyor module 90. As with all of the drawings, it is to be understood that FIGS. 4A through 4D are merely illustrative. For instance, it should not be inferred that the roller-supporting capacities of the outer and inner support structures 100 and 200 are necessarily equal in various embodiments; one of the support structures 100 and 200 could have the capacity to support many more rollers than the other of the support structures 100 and 200, for instance. Furthermore, within the scope and contemplation of the invention are versions in which the outer and inner support structures 100 and 200 can be contracted such that all of the rollers 140 and 240 are shared rollers 140, 240. Moreover, embodiments in which the inner support structure 200 can be extended with respect to the outer support structure 100 such that there are no shared rollers 140, 240 are also regarded as within the scope of the invention. Alternative versions of embodiments in which the inner support structure 200 can be extended so that there are no shared rollers 140, 240 are such that the inner support structure 200 can be extended and selectively retained in a position in which the distance between the roller axis 242 of the roller 240 of the second plurality of rollers 240 nearest the first end 220 of the second support structure 200 and the roller axis 142 of the roller 140 of the first plurality of rollers 140 nearest the second end 122 of the first support structure 100 corresponds to the predetermined roller axis spacing RS.

Extension apparatus 50 similar to the extension apparatus 50 previously described in connection with single-support-structure conveyor modules 15 are included in various versions of conveyor modules 90 including at least two support structures 100 and 200, for instance. Furthermore, alternative versions of multi-support-structure conveyor modules such as the illustrative dual-support structure modules 90 discussed above are non-power conveyor modules and power conveyor modules including one or more drive rollers. Although not required, for reasons previously discussed, in various versions of a multi-support-structure power roller conveyor module 90, a drive roller is among the shared rollers 142, 242, where applicable, because, in a typical embodiment, a shared roller 142, 242 is among the more central rollers in the conveyor module 90.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A roller conveyor module comprising:
   a first support structure having first and second ends and including first and second parallel and laterally spaced, longitudinally extending frame members;
   a first set of rollers supported by, and extending between, the parallel frame members of the first support structure, each of which rollers rotates about a lateral axis parallel to, and coplanar with, the axes of other rollers among the first set of rollers, the axes of the rollers in the first set of rollers being equally spaced in accordance with a predetermined roller-axis spacing;
   a second support structure having first and second longitudinally opposed ends and being reciprocably carried between the first and second frame members of the first support structure such that the second end of the second support structure is extendable beyond the second end of the first support structure, wherein each roller of a selected set of rollers among the first set of rollers is selectively removable to accommodate the retraction of the second support structure with respect to the first support structure;
   a second set of rollers supported by the second support structure, each of which rollers rotates about a lateral axis coplanar with the axes of the rollers comprising the first set of rollers, the rollers of the second set of rollers being spaced equally in accordance with the predetermined roller-axis spacing, wherein the second support structure is longitudinally reciprocable into positions in which the axis of the roller of the second set of rollers nearest the first end of the second support structure is separated from the axis of the roller of the first set of rollers nearest the second end of the first support structure by a distance corresponding to the predetermined roller-axis spacing; and
   at least one set of extension apparatus reciprocably depending from the conveyor module and being infinitely positionable between a retracted position and an extended position beyond at least one of the first end of the first support structure and the second end of the second support structure in order to selectively extend the overall length of the conveyor module.

2. The roller conveyor module of claim 1 wherein the set of extension apparatus comprises
   (i) a first set of extension apparatus for extending beyond the first end of the first support structure and longitudinal reciprocation between fully retracted and extended positions that are separated by a distance corresponding to at least one half the predetermined roller-axis spacing; and
   (ii) a second set of extension apparatus for extending beyond the second end of the second support structure and longitudinal reciprocation between fully retracted and extended positions that are separated by a distance corresponding to at least one half the predetermined roller-axis spacing.

3. The roller conveyor module of claim 2 wherein the first set of extension apparatus is selectively coupleable with a unit of equipment adjacent the first end of the first support structure and the second set of extension apparatus is selectively coupleable with a unit of equipment adjacent the second end of the second support structure.

4. The roller conveyor module of claim 1 wherein the at least one set of extension apparatus is selectively coupleable with a unit of equipment adjacent at least one of (i) the first end of the first support structure and (ii) the second end of the second support structure.

5. A roller conveyor module comprising:
   a first support structure including first and second laterally spaced, elongated frame members arranged in parallel and extending along a central longitudinal axis, each of the first and second frame members having a first end and a second end coinciding with, respectively, first and second ends of the first support structure;

a first plurality of rollers supported by, and extending between, the parallel frame members of the first support structure, each of which rollers rotates about an axis perpendicular to the central longitudinal axis and parallel to the axes of other rollers among the first plurality of rollers;

a second support structure carried between the first and second frame members of the first support structure and retained for longitudinal reciprocation between a fully retracted and a fully extended position with respect to the first support structure, the second support structure comprising first and second laterally spaced, elongated frame members arranged in parallel and extending along a central longitudinal axis, each of the first and second frame members having a first end and a second end coinciding with, respectively, first and second ends of the second support structure; and a second plurality of rollers supported by the second support structure, each of which rollers rotates about an axis parallel to the axes of the rollers comprising the first plurality of rollers, wherein each roller of a selected set of rollers among the first plurality of rollers is selectively removable to accommodate the retraction of the second support structure with respect to the first support structure, wherein the second end of the second support structure is extendable beyond the second end of the first support structure and at least one of (i) the first support structure further comprises extension apparatus infinitely positionable, and selectively retainable, between a retracted position and an extended position in which the extension apparatus extends beyond the first end of the first support structure, the extension apparatus furthermore being adapted for selective coupling to a unit of equipment adjacent the roller conveyor module; and (ii) the second support structure further comprises extension apparatus infinitely positionable, and selectively retainable, between a retracted position and an extended position in which the extension apparatus extends beyond the second end of the second support structure, the extension apparatus furthermore being adapted for selective coupling to a unit of equipment adjacent the roller conveyor module.

6. The roller conveyor module of claim 5 wherein the rollers of the first plurality of rollers are coplanar with the rollers of the second plurality of rollers, the roller axes of each of the first and second pluralities of rollers are equally spaced in accordance with a predetermined roller-axis spacing and at least one of (i) the extension apparatus of the first support structure is adapted for longitudinal reciprocation between fully retracted and extended positions that are separated by a distance corresponding to at least one half the predetermined roller-axis spacing; and (ii) the extension apparatus of the second support structure is adapted for longitudinal reciprocation between fully retracted and extended positions that are separated by a distance corresponding to at least one half the predetermined roller-axis spacing.

7. The roller conveyor module of claim 6 wherein rollers whose axes are longitudinally situated between the first end of the second support structure and the second end of the first support structure are regarded as shared rollers and the second support structure is selectively retainable in positions with respect to the first support structure in which the distance between the roller axis of the shared roller nearest the first end of the second support structure and the roller axis of the unshared roller of the first set of rollers nearest the second end of the first support structure corresponds to the predetermined roller spacing so that roller spacing continuity is maintained among the rollers of the first and second pluralities of rollers.

8. The roller conveyor module of claim 7 wherein each roller of the first plurality of rollers is selectively removable from the first support structure and the second support structure is retractable into a position in which all rollers supported between the first and second frame members of the first support structure are shared rollers.

9. The roller conveyor of claim 7 wherein the second support structure is extendable to a position in which no rollers are shared rollers and in which the distance between the roller axis of the roller of the second plurality of rollers nearest the first end of the second support structure and the roller axis of the roller of the first plurality of rollers nearest the second end of the first support structure corresponds to the predetermined roller axis spacing.

10. The roller conveyor module of claim 5 wherein at least one roller among at least one of the first and second pluralities of rollers is a drive roller and in which each roller of a selected set of rollers among at least one of the first and second pluralities of rollers is an driven roller mechanically linked to the drive roller such that rotation of the drive roller results in rotation of each driven roller.

11. The roller conveyor module of claim 10 wherein each driven roller is linked one of (i) directly to the drive roller and (ii) indirectly to the drive roller through linkage to another driven roller by a flexible mechanical linkage.

12. The roller conveyor module of claim 10 wherein a shared roller is a drive roller and wherein the selected set of driven rollers includes at least one of (i) a shared roller, (ii) an unshared roller of the first plurality of rollers and (iii) an unshared roller of the second plurality of rollers.

* * * * *